Sept. 26, 1950 D. W. WIREBAUGH 2,523,931

COMPENSATING CENTER SUPPORT

Filed Aug. 8, 1946 4 Sheets-Sheet 1

INVENTOR.
David W. Wirebaugh
BY Des Jardins & Compton
HIS ATTORNEYS

INVENTOR.
David W. Wirebaugh
BY
DesJardins & Compton
HIS ATTORNEYS

Sept. 26, 1950 D. W. WIREBAUGH 2,523,931

COMPENSATING CENTER SUPPORT

Filed Aug. 8, 1946 4 Sheets-Sheet 3

INVENTOR.
David W. Wirebaugh
BY Des Jardins & Compton
HIS ATTORNEYS

Sept. 26, 1950 D. W. WIREBAUGH 2,523,931

COMPENSATING CENTER SUPPORT

Filed Aug. 8, 1946 4 Sheets-Sheet 4

INVENTOR.

David W. Wirebaugh

BY Des Jardins & Compton

HIS ATTORNEYS

Patented Sept. 26, 1950 2,523,931

UNITED STATES PATENT OFFICE 2,523,931

COMPENSATING CENTER SUPPORT

David W. Wirebaugh, Cincinnati, Ohio

Application August 8, 1946, Serial No. 689,081

12 Claims. (Cl. 82—33)

My invention relates to improvements in compensating center supports, and has to do, more particularly, with a center support for rotatably supporting and locating a work piece in a lathe, grinder or like machine.

It is customary to support the work piece in a lathe or grinder by means of two opposed center supports, so that the work piece is revoluble about a longitudinal axis. For that purpose, conical center holes are formed in the ends of the work piece, in which the conical tips of the center supports engage.

Where a great number of like work pieces are to be worked alike, it has been the custom to leave the tools in set position on the machine and position the work piece with reference thereto by selectively boring the center holes to bring about an exact position of the work piece with reference to one stationary center support and the tools. However, prior to my invention, there has been considerable irregularity, in practice, in the formation or location of the center holes in the work pieces, some of them being too deep and others being too shallow and, since the positioning of the work piece in the machine depends upon the depth of the center holes, these variations in depth of the center holes result in irregularities in the positioning of the work pieces.

The present invention is an improvement on the structure disclosed in my co-pending application for United States Letters Patent, Serial No. 601,574, filed June 26, 1945, now Patent No. 2,435,417, granted February 3, 1948, wherein I provided a compensating center support to automatically adjust for variations in work pieces.

The principal object of my invention is to provide an improved compensating center support for a work piece, that is responsive to a gauge set upon or fastened to the work piece, so that the work piece is automatically located in the lathe by such gauge, notwithstanding variations from normal in the depth of the center holes of the work piece.

A further object of my invention consists in providing adjustable center supports, together with automatic means for clamping one of the supports in an adjusted position upon movement of the work piece to a predetermined position relative to the machine.

A further object of my invention is to provide an improved compensating center support of such nature that the center hole in a work piece may engage with the conical tip of said support, whereby the latter is adjusted longitudinally, by movement of the work piece, until the work piece reaches a predetermined position, with reference to fixed points on the machine, whereupon the center support will be locked against further adjustment.

Another object of my invention consists in providing such a compensating center support provided with manually operable means for releasing it from locked position and resetting the automatic means so a new work piece may be inserted and automatically positioned.

Another object of my invention is to provide a longitudinally movable center support for a lathe, which center support is adjusted by movement of a work piece against it which moves it until a gauge point on the work piece makes contact with an automatically locking control means on the lathe which locks the support against further movement.

Another object of the invention is to provide a novel automatically adjustable center support for a lathe or like machine, whereby, when a work piece, having a gauge thereon, is moved into contact with the center support, the center support will be moved longitudinally until the gauge makes contact with a locking button which trips mechanism to lock the center support against further movement.

Another object of the invention is to provide a center support for a lathe, which center support is movable longitudinally to a definite point by a work piece pushed against it, said point being determined by a gauge on the work piece which trips a spring driven locking means operating on the support.

Further objects, and objects relating to details of construction and economies of operation, will definitely appear from the detailed description to follow. In one instance, I have accomplished the objects of my invention by the devices and means described in the following specification. My invention is clearly defined and pointed out in the appended claims. A structure constituting a preferred embodiment of my invention is illustrated in the accompanying drawings, forming a part of this specification, in which, Fig. 1 is a fragmentary view of a lathe in side elevation showing a portion of a headstock, a portion of a movable tailstock, center supports mounted in each the headstock and tailstock, a work piece, and a gauge mounted on the work piece shown in position ready to actuate my novel mechanism.

In the drawings, the same reference numerals refer to the same parts throughout the several views, and the sectional views are taken looking in the direction of the arrows at the ends of the section lines.

In general, my invention comprises a supporting sleeve, having a center support in the form of a plunger that is longitudinally adjustable in the sleeve, and which has a conical tip adapted to engage in a center hole in a work piece, together with means for automatically clamping the plunger in adjusted position with respect to said sleeve. The sleeve is supported in one of the work heads of the machine and, for the purpose of this disclosure, will be shown mounted in the headstock of a lathe. The means for clamping the plunger in the adjusted position is operated automatically, upon bringing the work piece engaged with the conical tip to a predetermined position with respect to the sleeve. This automatic clamping means is trigger-operated by the contact of a gauge on the work piece or by contact of a portion of the work piece with a tripping button. Spring means is provided for normally holding the plunger projected from the sleeve, and I also provide means for limiting the projection of said plunger. The means for clamping the plunger in adjusted position is in the form of an internally-threaded nut carried by the sleeve, which internal threads cooperate with threads on the plunger, so that as the plunger moves, the nut turns and so that if the nut is held stationary against rotation, the movement of the plunger in the sleeve is stopped. A brake-band is provided within the sleeve and is disposed circumferentially around the nut so that if the brake-band is constricted about the circumference of the nut, its rotation is stopped with respect to the sleeve, and if the brake-band is loose around the nut, the nut may rotate with respect to the sleeve. Means is provided for constricting the brake-band, said means including a device which may be potentially preset, by the winding of a spring actuator, and held in the preset position by a trigger mechanism. In the preset position the band is loose around the nut, and the constricting band may be rendered effective by pressure upon the button on the end of the sleeve to cause the tripping of said trigger. Before a work piece is positioned between the lathe centers, the brake-band mechanism is set to the preset condition and, as the work piece is moved toward the headstock, the plunger center support is pushed inwardly in the sleeve until a gauge on the work piece makes contact with the trip button located in the sleeve, whereupon the brake-band is caused to tighten about the nut and prevent any further inwardly motion of the plunger. It is within the scope of the invention to cause the trip button to be operated without an auxiliary gauge attached to the work piece, if a portion of the work piece is so formed as to make contact with the tripping button at the proper time.

Figure 1:
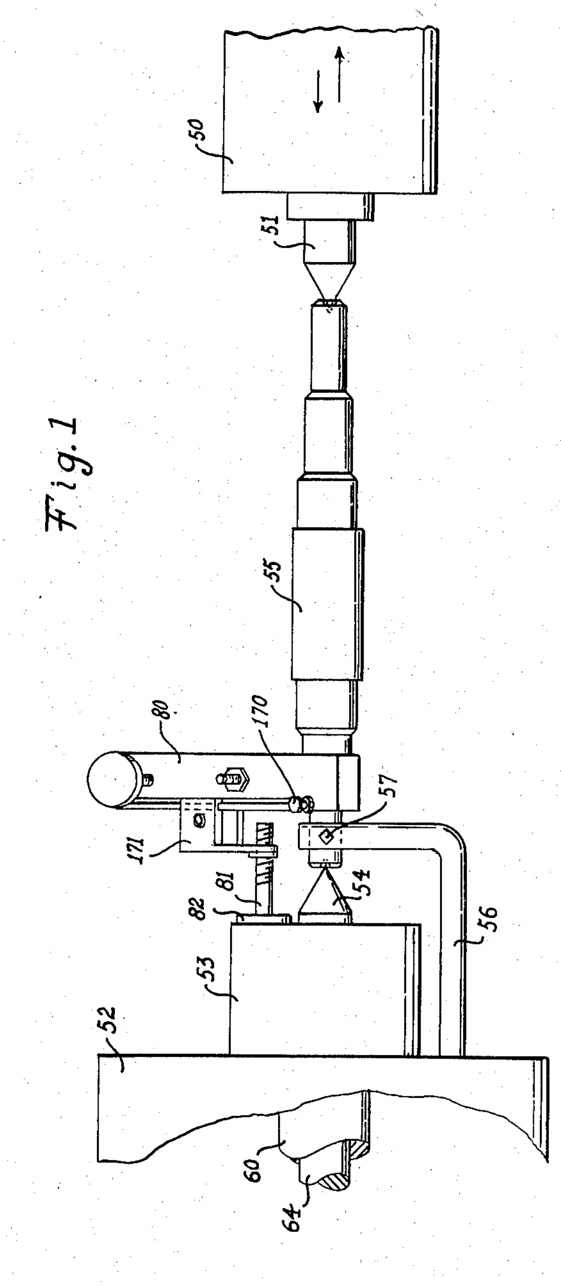
Figure 2:
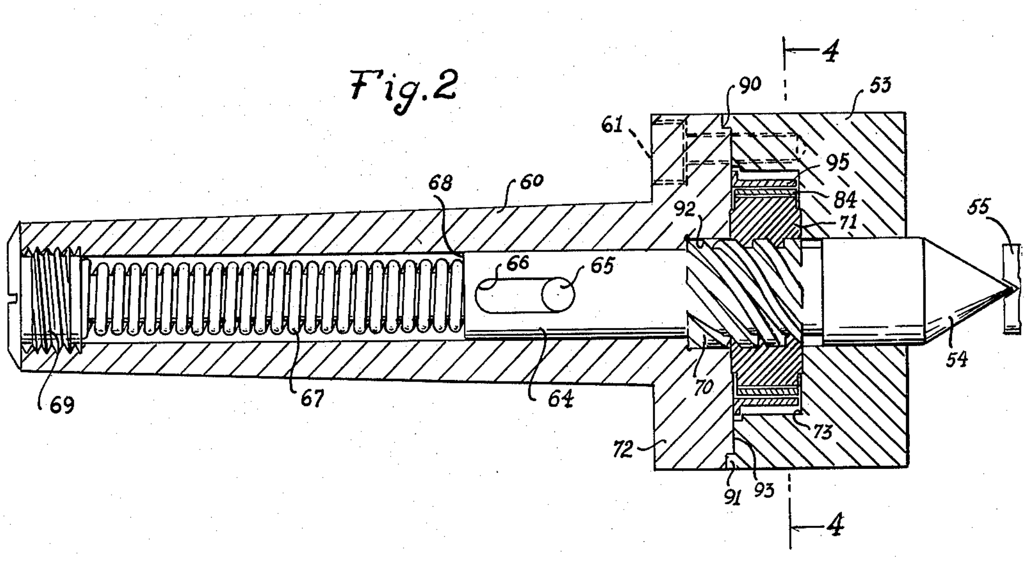
Fig. 2 is a view, partly in section, looking in the direction of the section line 2—2 of Fig. 3, showing the center support of the headstock mounted in its housing held in the headstock, and shows the locking nut and brake by which the adjusted position of the center support is maintained.

Referring to the numbered parts of the drawings, my compensating center support is carried by a supporting sleeve 60 (Fig. 2) having a tapered exterior portion, which, as shown in Fig. 1, is mounted in the headstock of a lathe centrally of the face plate 52. The sleeve 60 (Fig. 2) has an enlarged end 72 to which a head piece 53 is bolted, by bolts such as bolts 61, 62 and 63 (see also Fig. 4), which hold, in cavities within it, the brake and tripping mechanism which form the chief features of my invention. Referring to Fig. 2, the sleeve 60 and head piece 53 have slidable, therein, plunger 64, limited in motion by pin 65, carried by sleeve 60, sliding in clearance slot 66 cut in the plunger. Surrounding a guide pin abutting against the interior end of the plunger 64, is a spring 67 which abuts against the shoulder 68 on one end, and which abuts against the head of a screw bolt 69, screwed into the interior end of the spindle, on the other end. Spring 67 normally urges the plunger 64 toward the work piece, or to the right as seen in Figs. 1 and 2. Fig. 2 shows the plunger 64 as pushed into the sleeve by the end of work piece 55 making contact with the conical work tip 54, after the tailstock has made some movement toward the headstock. When the work piece 55 is brought in contact with the conical tip 54 of the plunger 64 and moves it inwardly, a threaded portion 70 of the plunger causes the rotation of internally threaded nut 71, which nut is mounted in recess 73 in the head portion 53. Release of the work piece 55 by movement of the tailstock 50 (Fig. 1)

away from the headstock, permits the plunger to move outwardly under the influence of spring 67, to the limit determined by the length of slot 66. When the plunger moves outwardly the nut 71 (Fig. 2) rotates reversely.

Referring to Fig. 1, when it is desired to put a work piece in the lathe which is fitted with my novel compensating center support, the tailstock end of the work piece is fitted, by means of a center hole previously bored therein, on the conical tip of center support 51, held in the tailstock 50, and the tailstock is moved towards the conical tip 54 of the automatically compensating plunger center support 64 in the headstock. As the conical tip 54 of the plunger 64 is met by the end of the work piece moving towards it and enters a center hole therein, the plunger 64 commences moving inwardly against the counter-action of the spring 67 until automatically stopped. Mounted in the face plate 52 is a driving member 56 which may be fastened to said work piece by means of a bolt 57 or by other means, which serves to turn the work piece in the ordinary manner.

Figure 3:
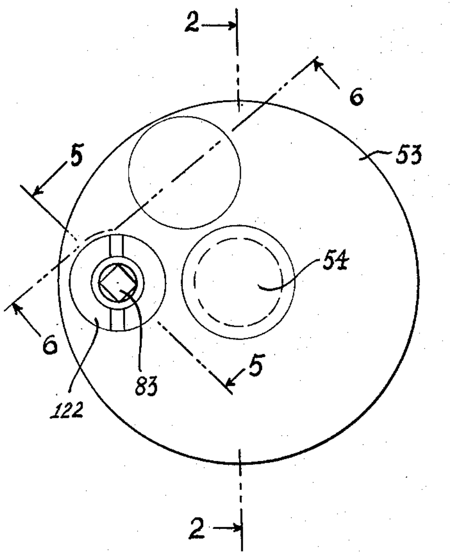
Fig. 3 is an elevation of the novel compensating center support mechanism in its housing as looked at from the work piece side of the headstock in which it is mounted.

Referring again to Fig. 1, I show a gauge 80, attached to the work piece, which gauge is positioned on the work piece, with reference to some work point on the work piece, and adjusted so that an adjusted arm 81 on the gauge is in line with tripping button 82 in the head piece 53, to the end that when the work piece is brought to the position shown in Fig. 1, arm 81 comes into contact with said tripping button. Further movement of the work piece toward the headstock causes the button to move into the head piece 53 to trip the mechanism which causes brake-band 84 (Fig. 2) to be constricted around the nut 71, to keep the same from turning, stopping the movement of the plunger 64 into the supporting sleeve 60 and, thus, automatically causing the work piece to be positioned according to the setting of the gauge 80. In removing the work piece, the tailstock is moved away from the headstock and the work piece removed in the ordinary fashion. Before a new work piece is inserted into the lathe the compensating center support mechanism must be reset and this is done by winding a key spindle 83 (Fig. 3), to be described. The gauge 80 (Fig. 1) is then placed in position on a new work piece and the work piece is brought into position between the lathe centers, and the tailstock moved toward the headstock, until the button 82 is pushed in sufficiently to trip the brake mechanism to stop further movement.

It will be understood from what has been said as to the operations of putting in work pieces and taking out work pieces, that the invention is best utilized in mass production where the work pieces are alike, in order that the same gauge setting and gauge may be used. The chief advantage of this invention pertains to the fact that, by its use, work pieces may be positioned with an exact relation to the tools on the lathe, regardless of the variations in depth of the center holes between various work pieces.

Figure 18:
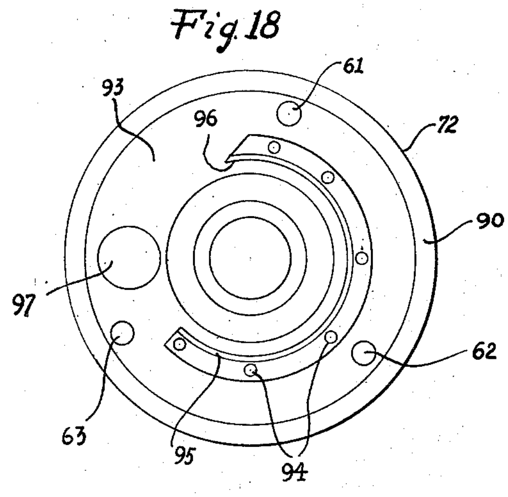
Fig. 18 is a right end elevation of the center support sleeve which is held in the headstock and in which the center support is slidably movable as shown in Fig. 2, this figure showing in detail how the brake-band retainer is mounted thereon.

Referring to Figs. 2 and 18, on the enlarged end 72 of the sleeve 60, on the face thereof toward the work piece, an offset shoulder 90 cooperates with a rim 91 on the head piece 53, to form a fitted connection between the two pieces, which are then fastened together with the bolts 61, 62 and 63, as has been described. The counter-sunk portion 92 of the enlarged end 72 permits the threaded portion 70 of the plunger to move to the extreme inward position. The elevated face 93 has welded thereto, as by welds 94 (Fig. 18), a flanged brake retaining ring 95. The flange portion of ring 95 which is welded to the face 93 turns outward from the face, on its inner aspect, to form a retaining wall against which the brake-band 84, when loosened by the resetting operation, is pushed to equalize its movement away from the nut 71 (see also Fig. 4). By referring to Figs. 2 and 4, it is shown how the ring 95 held by sleeve 60, nests the brake-band 84 supported by head piece 53 in spaced relation, except for a breech 96 to permit the fastening of the brake-band ends to the spring driven constriction mechanism located laterally from the ring at said breech.

Figure 5:
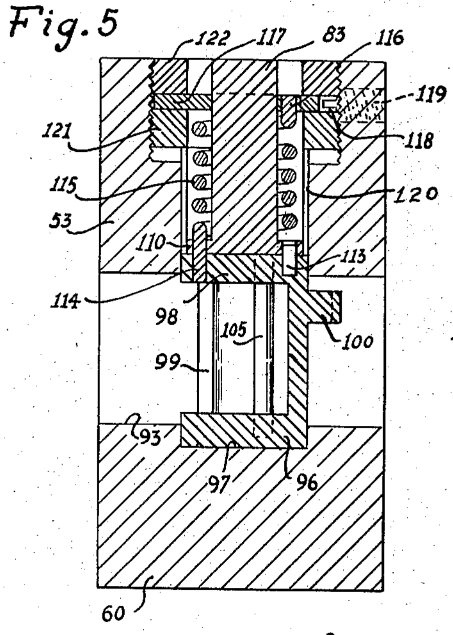
Fig. 5 is a sectional view of the spring actuated brake constriction operating mechanism taken on the section line 5—5 of Fig. 3.
Figure 6:
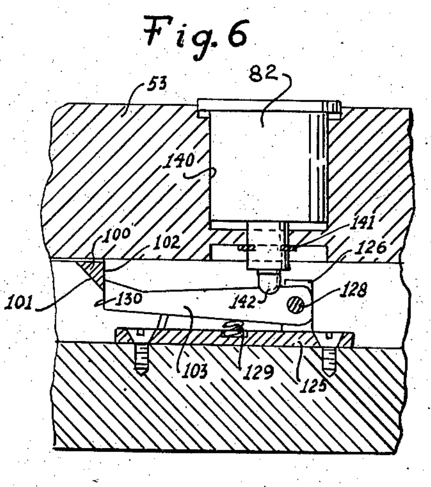
Fig. 6 is a view, partly in section, of the trip trigger and trigger actuating button for causing the brake operating mechanism to function.
Figure 16:
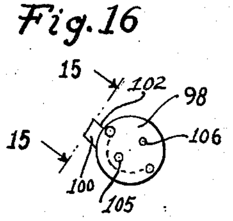
Figs. 14, 15 and 16 show various aspects of the brake-band actuating device, the view of Fig. 15 being taken on line 15—15 of Fig. 16.
Figure 15:
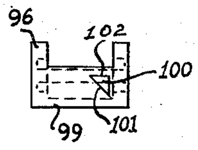
Figure 17:
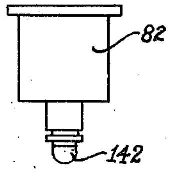
Fig. 17 is an elevation of the trigger actuating contact button for tripping the brake mechanism.
Figure 14:
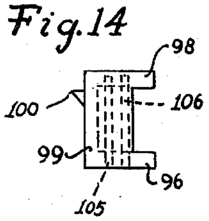
Figure 21:
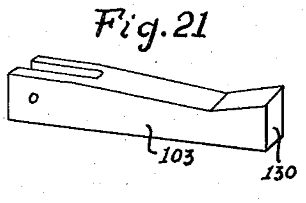
Fig. 21 is a side elevation of the trigger for releasing the brake actuating mechanism.
Figure 19:
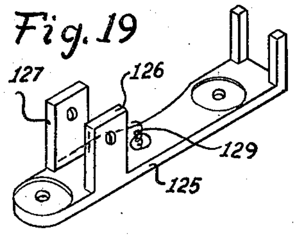
Fig. 19 is a perspective view of the trigger frame shown in section in Fig. 6.

The brake constrictor comprises a rotating barrel-like member having a disc base 96 (Figs. 5, 14 and 15), let into a circular countersunk hole 97 in the face 93 (see also Fig. 18), a disc top 98 (Figs. 5, 14 and 16), and a side wall 99, having projecting laterally thereof a step 100 of triangular cross-section in a plane tangential to the discs 96 and 98, and oriented to present a vertical trigger contact face 102, seen in Figs. 6, 15 and 16, and a sloping by-pass face 101 (Figs. 15 and 6) which cooperate with a trigger 103 (Figs. 4, 6 and 21), to be described, for latching, releasing and resetting the brake constrictor.

Figure 13:
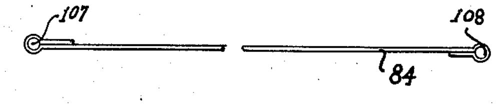
Fig. 13 is an edge view of the brake-band.
Figure 12:
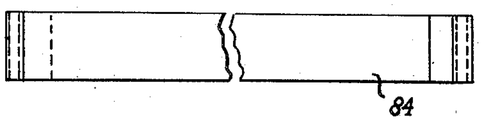
Fig. 12 is a side elevation of the brake-band.

Referring again to Figs. 4, 5, 14, 15 and 16, there are two pins 105 and 106 extending between the top disc 98 and the bottom disc 96 of the brake constrictor, which pins are passed through the loops 107 and 108 on the ends of the brake-band 84 (see Figs. 4 and 13) interposed between said top and bottom discs. Pins 105 and 106 are spaced slightly apart so that by turning the barrel-like member clockwise, as viewed in Fig. 4, the brake-band is constricted around nut 71, and by turning it counter-clockwise the brake-band is loosened.

Figure 20:
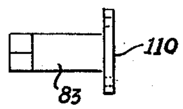
Fig. 20 is a detail of the winding spindle by which the brake actuating mechanism is reset, this spindle being shown in relation to the other parts in Fig. 5.

Winding spindle 83 (Fig. 3) has an enlarged disc end 110 (see Fig. 20) which lies on top of top disc 98. Two pairs of matching holes pierce the two discs, one pair receiving a pin 113 and the other pair receiving the lower end 114 of a coil spring 115 wound around the winding spindle. The upper end 116 of the spring is received in a hole in a washer 117 which has, around its edge, a plurality of notches like notch 118 by which the spring may be adjusted to proper tension and locked by set screw 119. Extending around spring 115 is a sleeve 120 retained by nut 121. Washer 117 is held between nut 121 and nut 122. The spring is normally under tension tending to move the brake-band to constricting condition, which is the clockwise movement of pins 105 and 106 around their common center of rotation, as viewed in Fig. 4.

Figure 4:
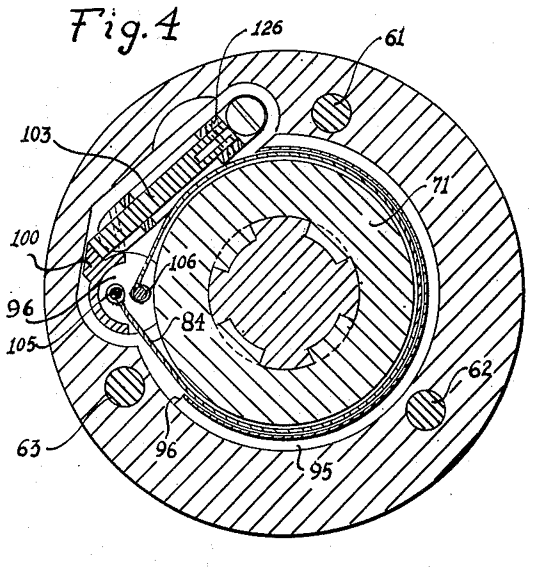
Fig. 4 is a sectional view of my novel mechanism as viewed in the direction of the arrows on the line 4—4 of Fig. 2.

Trigger 103 (Figs. 4, 6, 19 and 21) pinned for rocking in a support 125, between ears 126 and 127, by pin 128, is normally held in a latching position, shown in Fig. 6, by spring 129, where face 130, thereon, blocks the constricting movement of the brake constrictor, by contact against latching face 102 when the brake constrictor tries to move from the position shown in Fig. 4.

Tripping button 82 (Figs. 1 and 6), movable slightly in aperture 140 in head piece 53, as determined by a washer 141 limiting its outward motion from head 53 and as determined by the depth of aperture 140 limiting its inward motion, has a ball end 142 which rests on trigger 103, near the pin 128. As trigger 103 is normally held upward (as seen in Fig. 6), by spring 129, the button 140 is normally protruded, slightly, from the head piece 53, but is subject to being moved in slightly against the action of spring 129, which motion causes the trigger 103 to move to ineffective position.

It will be observed that one end of spring 115 is connected to disc 98 (Fig. 5) and the other end is effectively connected through washer 117 and set screw 119 to head piece 53. Therefore, it is only necessary for an operator to wind spindle 83 until the step 110 by-passes the trigger, by means of face 101 (Fig. 6), in which event the trigger moves against the action of spring 129 and then resumes its effective position after the step 100 has moved by, in order to effectuate the preset conditioning of my novel device. Spindle 83 has a square-end section to receive a winding tool. Slight movement inwardly of button 82 (Fig. 6) will then trip the mechanism and cause the brake-band constrictor to function immediately.

Figure 7:
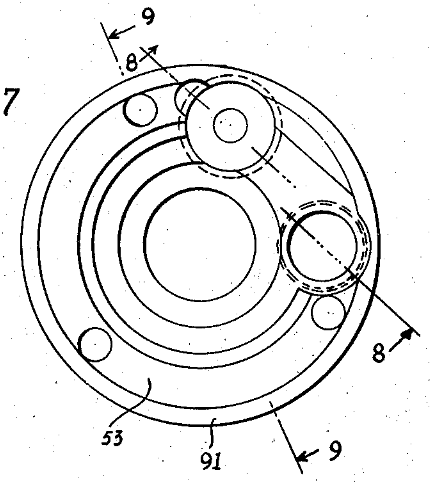
Fig. 7 is an elevation of the casing which holds the brake mechanism, the means for potentially conditioning and tripping the brake mechanism, and the nut which is held by the brake.
Figure 9:
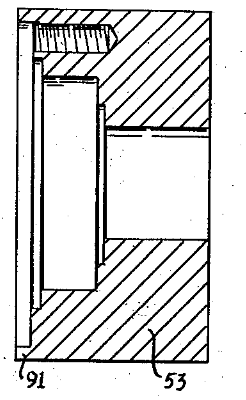
Fig. 9 is a sectional view through Fig. 7, on the section line 9—9, looking in the direction of the arrows.
Figure 8:
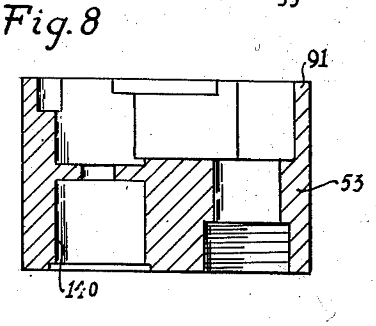
Fig. 8 is a sectional view taken on the line 8—8 of Fig. 7, looking in the direction of the arrows.
Figure 10:
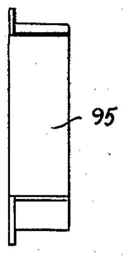
Fig. 10 is a view of the brake band retainer collar showing the braking surface in side elevation.
Figure 11:
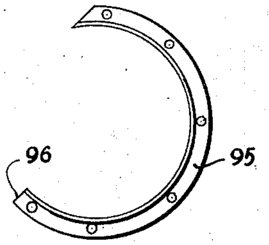
Fig. 11 shows the brake-band retainer, with the braking surface in plan view.

Figs. 7, 8 and 9 are various aspects of the head piece 53 showing the borings therein to accommodate the described mechanism.

Referring to Fig. 1, gauge 80 is provided with set screw means 170 to clamp it at the desired point on work piece 55, and is provided with an adjustable bracket 171 thereon, which supports feeler arm 81, also adjustable. With the gauge set in place on a work piece, as the tailstock 50 moves the work piece toward the headstock, feeler arm 81 will push button 82 in at the proper position of the work piece and stop the sliding of the plunger center support 64, thus accurately positioning the work piece with reference to whatever tool set-up has been previously made on the machine.

Thus, by use of my device, work pieces of the same kind, but with variation in center-hole depths may be accurately and automatically positioned longitudinally in a machine of the class described.

By my device all trial and error center boring operations are dispensed with in accurately positioning like work pieces longitudinally in a lathe.

I am aware that the devices shown herein are susceptible of considerable variation without departing from the spirit of my invention, and, therefore, I claim my invention broadly as indicated by the appended claims.

Having thus described my invention, what I claim as new and useful and desire to secure by Letters Patent is:

1. A compensating center for rotatably supporting a work piece, including the combination of a supporting sleeve; a plunger adjustable longitudinally in said sleeve and having an externally-threaded front end and a conical tip adapted to engage in a center hole in a work piece; an internally-threaded nut carried by said sleeve and cooperating with the threaded portion of said plunger; and means, including a brake-band, adjustable to a slack and a constricted condition, actuated to a constricted condition by movement of the work piece to predetermined position with respect to said sleeve for automatically holding said nut against rotation to hold the plunger in adjusted position.

2. A compensating center for rotatably supporting a work piece, including the combination of a supporting sleeve; a plunger adjustable longitudinally in said sleeve and having an externally-threaded end portion, and a conical tip adapted to engage in the center hole in a work piece; an internally-threaded nut carried by said sleeve and surrounding and adapted to cooperate with the threaded portion of said plunger, whereby longitudinal movement of said plunger in said sleeve causes the nut to rotate with respect to the sleeve; and constrictable means for preventing rotation of said nut with respect to said sleeve, said constrictable means acting upon the circumference of said nut, to hold the plunger in any position in which it is then located by preventing the nut from rotating.

3. A compensating center for rotatably supporting a work piece, including the combination of a supporting sleeve; a plunger adjustable longitudinally in said sleeve and having an externally-threaded front end portion and a conical tip adapted to engage in the center hole in a work piece; an internally-threaded nut carried by said sleeve and cooperating with the threaded portion of said plunger, whereby on longitudinal movement of said plunger the nut is rotated; means, including a constrictable brake-band, for preventing rotation of said nut with respect to said sleeve, when such brake-band is in constricted condition; spring means acting to project the plunger from the sleeve; and means actuated by movement of the work piece to a predetermined position with respect to the sleeve for automatically causing the brake-band to constrict to hold the nut against rotation, to lock the plunger in the so adjusted position.

4. A compensating center for rotatably supporting a work piece, including the combination of a supporting sleeve; a plunger adjustable longitudinally in said sleeve and having an externally-threaded front end portion and a conical tip adapted to engage in a center hole in a work piece; an internally-threaded nut, carried by said sleeve, surrounding and adapted to cooperate with the threaded portion of said plunger so that said nut tends to rotate one way when the plunger moves outwardly of the sleeve and tends to rotate the other way when the plunger moves inwardly of the sleeve; spring means acting to project the plunger from the sleeve, so that the plunger and nut have a normal positional relation with respect to one another and which relation is changed by rotation of the nut in the sleeve as the conical point has the work piece pushed against it, which pushes the plunger inwardly; a brake-band mounted in the sleeve and surrounding the circumferential periphery of the nut, said brake-band normally being in a loosened position around said nut so that said nut is free to rotate about the plunger; means attached to the brake-band which means is operable to constrict the brake-band around the nut to prevent the nut from rotating on the plunger; an actuator for the operable means settable to a potential position under a triggering control; and means to trip the triggering control to render the potentially set actuator active to constrict the brake-band around the nut to prevent it from turning.

5. A compensating center for rotatably supporting a work piece including the combination of a supporting sleeve; a plunger adjustable longitudinally in said sleeve and having an externally-threaded front end portion and a conical tip adapted to engage in a center hole in a work piece; an internally-threaded nut carried by said sleeve and surrounding and cooperating with the threaded portion of said plunger, so that movement of the plunger in and out of the sleeve turns the nut accordingly; a spring normally forcing the plunger outwardly of the sleeve to a stop point; a brake-band mechanism, including a brake-band normally loosely surrounding the circumferential periphery of the nut but being connected to an actuator which when operated constricts the brake-band around the nut to prevent rotation thereof and to consequently render the plunger immobile in the sleeve; a contact button mounted in the sleeve and adapted to be moved slightly by contact of a work piece thereupon; and an operating means for said actuator rendered effective by movement of the button by the work piece to cause the actuating means to constrict the brake-band around the nut to render the plunger immobile.

6. A compensating center for rotatably supporting a work piece including the combination of a supporting sleeve; a plunger adjustable longitudinally in said sleeve and having an externally-threaded front end portion and a conical tip adapted to engage in a center hole in a work piece; an internally-threaded nut carried by said sleeve and surrounding and cooperating with the threaded portion of said plunger, whereby movement of the plunger in an out of the sleeve causes the nut to rotate accordingly, and said nut having a peripheral braking surface; resilient means normally pushing the plunger outwardly of the sleeve to a stopping point; a brake-band normally loosely surrounding the nut in non-braking relation thereto, but adapted to be constricted around said nut to stop movement thereof with relation to the sleeve and plunger; and spring actuated means, rendered effective by contact of a work piece with a button mounted in said sleeve, for constricting the brake-band to render the nut and plunger immobile in the sleeve.

7. A compensating center for rotatably supporting a work piece, including the combination of a supporting sleeve; a plunger adjustable longitudinally within said sleeve and having an externally-threaded front end portion and a conical tip adapted to engage in a center hole in a work piece; an internally-threaded nut carried by said sleeve and surrounding and cooperating with the threaded portion of said plunger, said nut rotating one way and another as the plunger moves inwardly and outwardly of the sleeve; means normally urging the plunger to an extended position outwardly of the sleeve, against a stop; a normally ineffective brake-band surrounding the periphery of the nut and adapted to be constricted upon the periphery of the nut to render it immobile with reference to the sleeve to hold the plunger fast in its then position in the sleeve; means mounted in the sleeve for actuating the brake-band to constrict around the nut to render it immobile, said actuating means being operated by a spring set to a wound condition and locked by a trigger mechanism rendered effective to release the spring by pressure exerted on said trigger; and a gauge member supported by a work piece which gauge member, when said work piece is pressed against the conical tip and pushes the plunger inwardly of the sleeve until the gauge makes contact with the triggering mechanism, causes the brake-band to constrict about the nut preventing further inward movement of the plunger.

8. In a center support mechanism for the headstock of a lathe, including in combination a sleeve to be held in the headstock of the lathe; a plunger slidable internally of the sleeve, said plunger having a conical end protruding from the sleeve, which plunger is normally projected outwardly of the sleeve to a stopping point by a spring, whereby the conical end may be engaged by a work piece pressed against it, and said plunger having an externally threaded portion within the sleeve; a nut mounted in the sleeve and surrounding the plunger, said nut having internal threads cooperating with the threads on the plunger, whereby outward movement of the plunger causes the nut to rotate in one direction and inward movement of the plunger causes the nut to rotate in the reverse direction; a brake-band mounted in the sleeve around the circumferential periphery of the nut and normally loose thereabout but having its ends mounted in a constricting mechanism which, when said constricting mechanism is operated, draws the band taut around the nut to prevent movement of it within the sleeve; a spring mounted in the sleeve, one end of the spring being connected to the sleeve and the other end to the constricting mechanism whereby the constricting mechanism may be set into a potential position by winding the spring; a trigger mechanism automatically acting to lock the constricting mechanism in potential position when wound; a button movable for tripping said trigger mechanism to render effective the spring, thus causing constriction of the brake-band; and a gauge supported by a work piece, which work piece, when moved into contact with the conical tip of the plunger, causes the plunger to move inwardly until the gauge makes contact with the button and moves it, thus tripping the trigger mechanism to cause the brake-band to be constricted.

9. In a compensating center support for holding a work piece in a lathe provided with a work piece driving rotating headstock piece, having a sleeve supported in the headstock of the lathe, the axis of said sleeve being in line with the axis of rotation of the headstock driving piece; the combination of a conically tipped center support axially mounted in said sleeve and adjustable longitudinally therein between two stopping points, said center support having an externally-threaded portion within the sleeve; resilient means normally projecting said center support outwardly of the sleeve to one of the stopping points, so that said support may be moved inwardly of the sleeve to the other stopping point by pressure applied against it; a nut mounted in the sleeve around the center support, said nut having a circular periphery and having internal threads which are in line with and engage the threads on the center support, said threads being so related that if the nut is held stationary with respect to the sleeve the center support is held immobile in the sleeve but when said nut is allowed to rotate within the sleeve the center support may move inwardly and outwardly thereof between the stops; a brake-band mounted in the sleeve around the periphery of the nut, said brake-band having two looped ends; a brake-band actuator mounted in said sleeve, said actuator including two spaced pins cooperating with the two loops of said brake-band, whereby turning of the actuator one way constricts the brake-band around the nut and turning the actuator the other way loosens the brake-band around the nut; a coil spring connected at one end to the brake-band actuator and connected at its other end to the sleeve, said coil being wound so that it normally tends to constrict the brake-band around the nut; means including a winding spindle, and a latch and trigger mechanism to wind and latch the actuating means against the action of the spring; and a button projecting from the work piece end of the sleeve, which button may be moved inwardly to trip the trigger mechanism to cause the spring to render the actuating means effective to constrict the band.

10. In a compensating center support for a rotating lathe headstock drive, for receiving a work piece to be rotated thereon, having a sleeve mounted in the headstock on the axis of rotation of the headstock drive; the combination of a center support slidably mounted within the sleeve said support being furnished with a conical tip at its work receiving end for supporting a work piece by a center hole, said center support having an externally threaded portion interiorly of the sleeve, and said center support being movable in the sleeve between two points; a spring normally projecting the center support outwardly, to its limit of motion in that direction; an internally-threaded nut, having a circumferential peripheral braking surface, rotatably supported in the sleeve around said center support, the threads of the nut engaging those of the center support so that, when said center support is moved, the nut is rotated according to the direction of movement of the center support; a brake-band, having two looped ends, surrounding said nut and adapted to be constricted so as to make frictional contact with the braking surface on the periphery of the nut; an actuator engaging the looped ends of the brake-band said actuator being rotatably mounted in the sleeve; a coil spring connected on one end to the sleeve and on the other end to the actuator, said coil being tensioned so as to normally cause the actuator to rotate to cause the brake-band to be constricted to hold the nut against rotation, thereby rendering the center support immovable in the sleeve; a latch member adapted to hold the actuator rotated in spring compressed position, against the action of the spring connecting the actuator and the sleeve, which rotation of the actuator may be accomplished by an operator; a button extending from the sleeve on the work side thereof, said button being slidably mounted in said sleeve so that inward pressure upon it releases the latch to cause the actuator to rotate and constrict the brake-band, said button being so positioned that a work piece having a gauge thereon which is brought in contact with the button by movement of the work piece against the conical tip of the support, with sufficient force to push it in, causes the tripping of the latch at a point in the inward movement of the center support determined by the setting of the gauge, so that at that point the support is held immobile in the sleeve.

11. In an automatically compensating center support for use in the headstock of a lathe, having a sleeve mounted in the headstock of the lathe, said sleeve having its longitudinal axis coincident with the axis of rotation of a work piece held in the lathe; the combination of a center support slidably mounted in the sleeve, said sliding movement being parallel with the center of rotation of work held in the lathe, and said sliding motion being restricted between two limits determined by a pin and slot connection between the sleeve and the center support, said center support having a conical tip protruding from the sleeve and having interiorly thereof an externally threaded portion; means resiliently forcing the center support so that it is moved to the limit of its position in a projecting direction from the sleeve; a nut rotatably mounted in the sleeve, said nut having internal threads cooperating with the threads on the center support, whereby movement of the center support between its limits of movement causes the nut to rotate accordingly and whereby, when the nut is held immobile, the center support will be held against sliding, and said nut having a circumferentially peripheral braking surface; a brake-band surrounding said nut, said brake-band having two ends whereby to fasten it to an actuating means; a rotatable actuating means held within the sleeve, said actuating means being connected to the brake-band, one end of the band being connected to a leg on said rotating means and the other end of the band being connected to a second leg on the rotating means, said legs being spaced apart, whereby rotation of said means in one direction constricts the band around the nut to render it immobile, and rotation in another direction loosens the band around the nut to release it for movement; a spring connecting the sleeve and the actuator which spring tends to constrict the band by rotating the actuator in a constricting manner; a latch means by which the actuator may be latched in release position after it has been rotated against the action of the spring connecting the actuator and the sleeve, said latch means being trippable to cause the actuator to respond to the spring to brake the movement of the nut; a button movably mounted in the sleeve, one end of said button contacting the latch and the other end of said button protruding from the sleeve toward the portion of the lathe occupied by a work piece, whereby a pushing of said button into the sleeve trips the latch.

12. In an automatically compensating center support for use in the headstock of the lathe, having a sleeve mounted in the headstock of the lathe, said sleeve having its longitudinal axis coincident with the axis of rotation of a work piece held in the lathe; the combination of a center support slidably mounted in the sleeve, said sliding movement being parallel with the center of rotation of work held in the lathe, and said sliding motion being restricted between two limits imposed by a pin and slot connection between the sleeve and the center support, said center support having a conical work receiving tip protruding from the sleeve and having interiorly thereof an externally threaded portion; means resiliently forcing the center support so that it is moved to the limit of its position in a projecting direction from the sleeve; a nut rotatably mounted in the sleeve, said nut having internal threads cooperating with the threads on the center support, whereby movement of the center support between its limits causes the nut to rotate accordingly and whereby, when the nut is held immobile, the center support will be held against sliding, and said nut having a circumferentially peripheral braking surface; a brake-band surrounding said nut, said brake-band having two ends whereby to fasten it to an actuating means; a rotatable actuating means held within the sleeve, said actuating means being connected to the brake-band, one end of the band being connected to a leg on said rotating means and the other end of the band being connected to a second leg on the rotating means, said legs being spaced apart, whereby rotation of said actuating means in one direction constricts the band around the nut to render it immobile, and rotation in another direction loosens the band around the nut to release it for movement; a spring connecting the sleeve and the actuator which spring tends to constrict the band by rotating the actuator in a constricting manner; a latch means by which the actuator may be latched in release position after it has been rotated against the action of the spring connecting the actuator and the sleeve, said latch means being trippable to cause the actuator to respond to the spring to brake the movement of the nut; a button movably mounted in the sleeve, one end of said button contacting the latch and the other end of said button protruding from the sleeve toward the portion of the lathe occupied by a work piece, whereby a pushing in of said button into the sleeve trips the latch; an adjustable gauge means attachable to a work piece, said adjustable means being situated on the work piece so that, as the work piece on which it is mounted is pressed against the conical tip of the center support, the adjustable means will make contact with the button when the center support is moved to a particular position inwardly of the sleeve, whereby to stop the inward motion of said center support.

DAVID W. WIREBAUGH.

REFERENCES CITED

The following references are of record in the file of this patent:

UNITED STATES PATENTS

| Number | Name | Date |
|---|---|---|
| 979,034 | Rowe | Dec. 20, 1910 |
| 1,829,619 | Svenson | Oct. 27, 1931 |

FOREIGN PATENTS

| Number | Country | Date |
|---|---|---|
| 541,581 | Great Britain | Dec. 2, 1941 |